(12) United States Patent
Arai et al.

(10) Patent No.: US 6,475,680 B1
(45) Date of Patent: Nov. 5, 2002

(54) LITHIUM SECONDARY BATTERY, ITS ELECTROLYTE, AND ELECTRIC APPARATUS USING THE SAME

(75) Inventors: Juichi Arai, Katsura-mura (JP); Hideaki Katayama, Hitachi (JP); Haruo Akahoshi, Hitachi (JP); Tomoe Takamura, Hitachi (JP); Takao Iwayanagi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/267,671

(22) Filed: Mar. 15, 1999

(30) Foreign Application Priority Data

Mar. 18, 1998 (JP) .......................... 10-068113

(51) Int. Cl.[7] .......................................... H01M 10/40
(52) U.S. Cl. ...................... 429/340; 429/330; 429/336
(58) Field of Search ................. 429/324, 330, 429/336, 340

(56) References Cited

U.S. PATENT DOCUMENTS

| | | | |
|---|---|---|---|
| 4,957,833 A | * | 9/1990 | Daifuku et al. ............. 429/197 |
| 5,506,068 A | * | 4/1996 | Dan et al. .................... 429/50 |
| 5,525,443 A | * | 6/1996 | Okuno et al. ............... 429/194 |
| 5,580,680 A | | 12/1996 | Chaloner-Gill et al. |

FOREIGN PATENT DOCUMENTS

| | | |
|---|---|---|
| EP | 0614239A2 A3 | 9/1994 |
| EP | 0631339A2 A3 | 12/1994 |
| EP | 0814531 A2 | 12/1997 |
| JP | 60 041775 * | 3/1985 .......... H01M/10/40 |

OTHER PUBLICATIONS

Patent Abstracts of Japan, Publication No. 62086673, Publication Date–Apr. 21, 1987.
Patent Abstracts of Japan, Publication No. 60041775, Publication Date–May 3, 1985.
Patent Abstracts of Japan, Publication No. 09147911, Publication Date–Jun. 6, 1997.
Database WPI, Derwent Publications, Ltd., Dec. 17, 1993, XP–002106697, Abstract of JP5335033.

* cited by examiner

*Primary Examiner*—Carol Chaney
(74) *Attorney, Agent, or Firm*—Antonelli, Terry, Stout & Kraus, LLP

(57) ABSTRACT

A lithium secondary battery which is capable of terminating its operation safely with no accompanying rapid change in appearance, no gas generation, nor pressure change when any of an overcharge, overdischarge, and abnormal temperature rise occurs in the secondary battery itself. The lithium secondary battery includes a negative electrode, which is capable of absorbing and desorbing lithium, a positive electrode, which is capable of absorbing and desorbing lithium, and a non-aqueous electrolyte, wherein the non-aqueous electrolyte is solidified by a thermal reaction at a designated temperature.

7 Claims, 8 Drawing Sheets

LITHIUM SECONDARY BATTERY, ITS ELECTROLYTE, AND ELECTRIC APPARATUS USING THE SAME

BACKGROUND OF THE INVENTION

The present invention relates to a lithium secondary battery; and, in particular, the invention relates to a rechargeable lithium secondary battery, which is improved in safety by having a self imposed safety function, to an electrolyte for the lithium secondary battery, and to an electric apparatus using the same.

A lithium secondary battery has a high voltage, a high energy density, and superior storage performance and repeat charge-discharge characteristics. Therefore, the lithium secondary battery is being used widely for portable electric consumer products. Furthermore, research and development for utilizing lithium secondary batteries as power sources, such as for electric vehicles and home power storage devices which provide power during the night, by developing batteries of increased size is being performed intensely. The lithium secondary battery is a product which is expected to be used widely in daily life as a clean energy source, and which can be expected to have a significant advantage in preventing environmental pollution and the warming-up of the earth from the release of carbon dioxide.

However, a flammable organic solvent is currently used in the battery in view of its reactivity with lithium and a restriction of the potential window. Therefore, if the temperature of the battery is elevated by any means, such as overcharging or exterior heating, the electrolyte causes a thermal runaway reaction and generates a flammable gas causing an increase in the internal pressure of the battery. The gas is released to the outside the battery can and causes an ignition or, in the worst case, an explosion. Therefore, it can not be emphasized too much that how widely the battery is used in the above objects depends on the extent its safety can be ensured. A carbonate group is generally used for the lithium battery, which uses carbon material for its negative electrode, because the carbonate group exhibits preferable battery characteristics. In particular, five membered ring compounds, such as ethylene carbonate and 1,2-propylene carbonate, are employed as a main solvent and are utilized as an indispensable solvent, because these compounds have a high dielectric constant, and readily dissociate lithium salts. These compounds cause a degradation reaction indicated by the following chemical equation (Equation 1), and generate a combustible gas, when they are heated or overcharged.

(Equation 1)

The internal pressure of the battery is increased by the combustible gas, the combustible gas is released from the battery can, and, in the worst case, an ignition and explosion are caused.

A method of preventing the ignition and explosion of the battery has been disclosed in JP-A-6-290793 (1994); wherein a solvent, which causes a polymerization reaction with $LiPF_6$, i.e., a lithium salt, is mixed as an electrolyte solvent, in order to make sure that the electrolyte will cause no decomposition reaction, but will produce a polymerization reaction when the temperature of the battery is elevated. JPA-6-283206 (1994) and JP-A-9-45369 (1997) disclose methods for solidifying the electrolyte by providing microcapsules, which contain a polymerization initiator and polymerizable material therein, in the electrolyte, in a separator, and the like, whereby these materials are released from the microcapsules to cause a polymerization reaction when the temperature of the battery is elevated.

In accordance with JP-A-6-290793 (1994), the solvent, which causes a polymerization reaction with $LiPF_6$ is restricted, and mixing one of the compounds in a cyclic ether group is indispensable. However, if the battery is composed of a system wherein the use of the compound in the cyclic ether group is not desirable in view of the battery characteristics, the compound in the cyclic ether group can not be used. A result of analyzing the heat generating behavior of an electrolyte solvent, made by mixing ethylene carbonate (EC) and ethylmethyl carbonate (EMC) in a 1:1 ratio, which is one of the carbonate group solvents exhibiting desirable battery characteristics with a carbon negative electrode, using differential scanning calorimetry (DSC), indicates that the solvent alone does not exhibit a large heat generation. However, a rapid reaction is indicated near 250° C. for the electrolyte dissolving $LIPF_6$ at one mol/liter, the carbonate solvent is decomposed, and a combustible gas is generated. As a result of analyzing an infrared spectrum of the specimens after the above test, it was found that an absorption based on a carbonyl radical of the carbonate molecule still remained at 1700 $cm^{-1}$ with the specimen of the solvent alone. On the contrary, the absorption disappeared with the specimen of the electrolyte dissolving $LIPF_6$ at one mol/liter. That means that the reaction indicated previously by the equation 1 has proceeded, and generation of lithium carbonate and ethylene gas could be observed. Accordingly, $LIPF_6$ can not be used effectively as the polymerization initiator in a system using a carbonate solvent as a main solvent.

In a case where microcapsules are used, as disclosed in JP-A-6-283206 (1994) and JP-A-9-45369 (1997), the temperature at which the polymerization initiator and the polymerizable material are released can be controlled based on the material forming the wall of the capsule. However, using a large amount of the microcapsules in a battery is difficult in view of the need to maintain desirable battery characteristics. It is difficult to interrupt propagation of the thermal runaway reaction with dispersed capsules, if the polymerization reaction does not proceed with a significantly rapid reaction rate, because the reaction will be generated locally with a microscale.

SUMMARY OF THE INVENTION

One of the objects of the present invention is to provide a lithium secondary battery, which is capable of terminating functions of the battery safely when any of an overcharge, an overdischarge, or an abnormal temperature rise condition occurs, without an accompanying rapid change in appearance, gas generation, or pressure change, and to provide its electrolyte and an electric apparatus using the same as a power source.

The present invention is characterized by the provision of a lithium secondary battery comprising a negative electrode which is capable of absorbing and desorbing lithium; a positive electrode which is capable of absorbing and desorbing lithium; and an aprotic organic electrolyte, wherein the aprotic organic electrolyte can be solidified by a thermal reaction at a designated temperature. The aprotic organic electrolyte comprises a lithium salt and a non-aqueous solvent; and, the non-aqueous solvent is provided in an amount sufficient to dissolve the lithium salt, and comprises a thermally polymerizable non-aqueous solvent. The content of the non-aqueous solvent, which can dissolve the lithium salt, is in the range of 50-95% by volume, desirably in the range of 65-90% by volume; and, the content of the thermally polymerizable solvent is in the range of 5-50% by volume, and, desirably, it is in the range of 10-35% by volume. The aprotic organic electrolyte can be solidified by a thermal reaction at a designated temperature.

The present invention relates to a lithium secondary battery comprising a negative electrode which is capable of absorbing and desorbing lithium; a positive electrode which is capable of absorbing and desorbing lithium; and an aprotic organic electrolyte, wherein its functions can be terminated safely in a non-returned condition without an accompanying rapid change in appearance, gas generation, or pressure change, particularly a pressure increase, when any of an overcharge, an overdischarge, or an abnormal temperature rise condition occurs.

The present invention also relates to an electrolyte for lithium secondary batteries, the electrolyte being characterized as comprising a lithium salt and a non-aqueous solvent, which pan dissolve the lithium salt, which electrolyte can be solidified by a thermal reaction at a designated temperature.

The present invention further relates to an electric apparatus, which is characterized in that the above described lithium secondary battery is used therein as an electric power source.

In accordance with the present invention, the electric apparatus using the lithium secondary battery as a power source can be free of a protecting means, such as a device for measuring the temperature and pressure of the battery to detect any of an overcharge, an overdischarge, or an abnormal temperature rise condition. The electric apparatus is characterized in that it has only a means for detecting the voltage or the current of the battery and a controlling means for switching the power source based on the above detected values; and, when any of the above abnormal conditions of the secondary battery itself occur, the functions of the battery can be terminated safely in a non-reversible manner without causing damage to the appearance of the battery.

The above described electric apparatus, to which the present invention is applicable, includes electric vehicles, electric power storage devices, and so on.

In accordance with the present invention, a carbonate solvent having superior battery characteristics can be used, such that most of the electrolyte is polymerized and solidified at 100° C. or higher in order to make the battery inactive and safe just before causing a degradation of the solvent by thermal runaway with reactions with the positive electrode and the negative electrode. That is, in order to solidify the electrolyte solvent rapidly in a short time by heating, it is advantageous to maintain the reaction initiator in a condition to be dissolved in the electrolyte. In this case, the reaction initiator must be inactive with the electrolyte at room temperature, stable electrochemically in a designated range of operation voltages, and reactive with the solvent at a temperature lower than the temperature for causing reactions with the charged positive electrode and the charged negative electrode. That is, the problem can be solved by mixing a thermal reaction type solvent, which is usable in a dissolved condition, with the carbonate group solvent in a range, wherein a battery characteristics are not deteriorated.

The above object of the invention can be achieved by making an appropriate polymerization initiator coexist at approximately 100° C. with a six membered ring carbonate, which can be polymerized by anion polymerization, or cation polymerization; or, the object of the invention can be achieved by making an appropriate polymerization initiator coexist with at least a seven membered ring sulfite, which is known to be capable of causing a polymerization without de-sulfur dioxide. Linear diphenylcarbonate derivatives also operate as polymerization initiators. That is, any one of diphenylcarbonate derivatives, at least six membered ring carbonate derivatives, and at least seven membered ring sulfite derivatives can be used by co-dissolving them with an electrolyte of the carbonate group solvent. The object of the invention can also be achieved by using the polymerization initiator in a dissolved condition.

As an aprotic organic electrolyte, organic solvents dissolving a lithium salt as an electrolyte and their derivatives can be used, particularly, five or less-membered cyclic compounds are desirable. That is, as for an organic solvent, most of them are thermally polymerizable, but the solvents which can generate combustible gases by a thermal decomposition with the addition of a lithium salt are desirable; practically, organic solvents, such as ethylene carbonate, propylene carbonate, butylene carbonate, pentylene carbonate, hexylene carbonate, heptalene carbonate, octalene carbonate, dimethyl carbonate, diethyl carbonate, dipropyl carbonate, dibutyl carbonate, dipentyl carbonate, dihexyl carbonate, diheptyl carbonate, dioctyl carbonate, methyethyl carbonate, methylpropyl carbonate, methylbutyl carbonate, methylpentyl carbonate, methylhexyl carbonate, methylheptyl carbonate, methyloctyl carbonate, ethylpropyl carbonate, ethylbutyl carbonate, ethylpentyl carbonate, ethylhexyl carbonate, ethylheptyl carbonate, ethyloctyl carbonate, propylbutyl carbonate, propylpentyl carbonate, propylhexyl carbonate, propylheptyl carbonate, propyloctyl carbonate, butylpentyl carbonate, butylhexyl carbonate, butylheptyl carbonate, butyloctyl carbonate, pentylhexyl carbonate, pentylheptyl carbonate, pentyloctyl carbonate, hexylheptyl carbonate, hexyloctyl carbonate, heptyloctyl carbonate, dioxolane, γ-butylolactone, tetrahydrofuran, 2-methyl tetrahydrofuran, and their halogenated derivatives, and lactone derivatives, lactam derivatives, phosphoric acid ester derivatives, phosphazene derivatives, and the like, may be used.

As for the thermal reactive solvents, or a thermally polymerizable non-aqueous solvent, six or more-membered cyclic organic compounds are desirable. Practically, a 6- to 10-membered cyclic carbonate, such as the following compounds can be used: 1,3-propylene carbonate, 1,3-butylene carbonate, 1,4-butylene carbonate, 1,5pentylene carbonate, 1,6-hexylene carbonate, 1,7-heptylene carbonate, 1,8-octylene carbonate, and their alkyl substituted derivatives, allyl substituted derivatives, aromatic substituted derivatives, nitro substituted derivatives, amino substituted derivatives, halogen substituted derivatives, diphenyl carbonate, di(nitrophenyl) carbonate, di(methylphenyl) carbonate, di(methoxyphenyl) carbonate, di(aminophenyl) carbonate.

Furthermore, 7 to 11-membered cyclic sulfate compounds such as the following compounds can be used: 1,4-butylene sulfate, 1,5-pentylene sulfate, 1,6-hexylene sulfate, 1,7-heptylene sulfate, 1,8-octylene sulfate, and their alkyl substituted derivatives, allyl substituted derivatives, aromatic substituted derivatives, nitro substituted derivatives, amino substituted derivatives, halogen substituted derivatives, and the like.

The thermal reactive organic solvent of the present invention can solidify the electrolyte by thermal polymerization of the organic solvent itself. However, the non-aqueous solvent itself, which can dissolve the lithium salt, can be thermally polymerized, and the whole body can be solidified.

The thermal reaction initiator for the non-aqueous solvent is an additive for decreasing the initiation temperature of the thermal polymerization; and, practically, the following can be used: iodine, lithium iodide, lithium fluoride, lithium bromide, lithium chloride, tetrakis(4-fluorophenyl) sodium borate, tetrakis(4-fluorophenyl) lithium borate, isoazobutylnitrile, 1,1'-azobis(cyclohexane-carbonitrile), 2,2'-azobis(2-methyl-N-(1,1-bis(hydroxymethyl)ethyl) propionamide, methyl iodide, benzene bromide, tetrabutyl ammonium iodide, trifluorodiethyl borate, triester phosphate, and others.

The kind and content of the reaction initiator is selected so that the polymerization and solidification reaction is initiated desirably at least at 120° C. in accordance with the temperature rise caused by an overcharge, or an overdischarge, or a temperature rise based on an external environmental condition. Further, the temperature is desirably at least 100° C., and preferably at least 80° C. Particularly, the reaction initiator, which is solidified by heating at 150° C. for 10 minutes and is not ignited in a safety test, is desirable. Therefore, as the electrolyte, a non-aqueous solvent which can be thermally polymerized at a temperature in the range of 100–150° C. is desirable. The content of the reaction initiator is desirably in the range of 0.5–10% by weight to the total weight of the electrolyte, and more desirably it is in the range of 1–5% by weight.

In accordance with the present invention, at least one of the current collectors of the negative electrode and the positive electrode desirably has a metallic layer, such as nickel plating and the like, which is made of a harder metal than the base metal of the current collector, on a roughened surface of the current collector.

In accordance with the present invention, at least one of the negative electrode active material and the positive electrode active material has graphite, and the graphite is desirably composed of 20% by weight or less of rhombohedral crystal and 80% by weight or more of hexagonal crystal.

In accordance with the present invention, a lithium secondary battery comprising a negative electrode having a negative electrode active material, which absorbs or desorbs lithium ions during a charging or a discharging period, on a surface of the current collector made of a thin metallic plate; a positive electrode having a positive electrode active material on the surface of the current collector made of a thin metallic plate; and a lithium ion conductive aprotic organic electrolyte or a polymer electrolyte, is desirably treated by a process, wherein an oxide layer composed of oxide whiskers are formed on the surface of the current collector, and subsequently the oxide layer is reduced for roughening the surface, before forming the respective active material on the surface of the at least one of the current collectors of the negative electrode and the positive electrode.

The active material is desirably formed on the surface of the current collectors composed of a thin metallic plate of at least one of the negative electrode and the positive electrode, after manufacturing the current collector to a desired thickness by cold milling and roughening the manufactured surface by the method previously described.

In accordance with the present invention, a current collector having its surface roughened by the method described previously is desirably used. That is, deterioration of the battery characteristics caused by the condition of a negative electrode current collector made of copper is mainly based on a decrease in the adhesiveness of a negative electrode current collector with the negative electrode active material. Therefore, the battery characteristics can be improved by increasing the adhesiveness of the current collector. Accordingly, a positive electrode, current collector having the same surface as the negative electrode current collector is desirable.

Since the positive electrode active material and the negative electrode active material are generally particles of 100 $\mu$m or less in diameter, the above object of the invention can be achieved by improving the adhesiveness of the particles with the materials of the current collector, such as aluminum or copper.

When particles are adhered to a metal, it is effective when the surface of the metal, whereon the particles are to be adhered, is previously treated with various processes, such as a process for forming an oxide on the surface of the metal; a process for reducing a part of or all of the above oxide by a chemical method or an electrical method; or further a process for nickel plating. The copper surface treated as indicated above is in a roughened condition in comparison with the condition before the treatment. The surface of the copper without treating it with the nickel plating does not have the metallic luster of copper, but has a color of dark brown or black due to optical scattering based on the roughened surface. As a method of causing the particles to adhere onto the copper surface which has been roughened, a method comprising the steps of applying a mixture of the particles and a resin onto the roughened surface of the copper, and pressure welding and heating can be used. As another method, a method comprising the steps of applying a slurry formed by mixing the particles with a solvent dissolving a resin onto the roughened surface, and pressure welding and heating can be used. In this case, the pressure welding and the heating can be performed sequentially or concurrently, but the advantages of the present invention can be achieved similarly in either case. The metal, the surface of which has been roughened, is improved in adhesiveness with the particles, but in particular, the ratio of effective surface area to apparent surface area is desirably at least 2. For instance, in a case of a metallic foil 100 mm square and 20 $\mu$m in thickness, the apparent surface area of the two planes is 20,000 $mm^2$. When both planes of the metallic foil having the apparent surface area of S ($mm^2$) are treated for roughening by the above method, the apparent surface area still remains as S ($mm^2$). The weight of the roughened metal foil is assumed to be M (g). A specific surface area of the roughened metal foil determined by a BET method is assumed to be $\rho(mm^2/g)$ Then, the effective surface area obtained from the specific surface area is expressed by $\rho \times M$ ($mm^2$). Therefore, the ratio of the effective surface area/apparent surface area is expressed by $(\rho \times M)/S$ ($mm^2/g$).

The negative electrode current collector relating to the present invention desirably has an effective surface area which is at least two times the apparent surface area, more desirably at least three times, and preferably at least four times the apparent surface area for obtaining stable characteristics. The upper limit is desirably 30 times, more desirably less than 20, and preferably less than 15. The thickness of the metallic foil of the current collector is desirably in the range of 5–30 $\mu$m, and more desirably it is in the range of 8–20 $\mu$m.

The metallic foil of the current collector is made of aluminum for the positive electrode and is made of copper for the negative electrode. The metallic foil for surface roughening according to the present invention is desirably manufactured by the steps of roughening the surface of the metallic foil as it is rolled, applying a positive active material or a negative active material onto the surface of the metallic foil in a condition of enhanced surface strength, and fabricating by pressing. Although annealing may be performed after the rolling, its surface hardness is desirably adjusted in connection with the annealing temperature using a method of fabrication by pressing.

The aprotic organic electrolyte secondary battery uses a metallic foil, the surface of which is treated using a method comprising at least the steps of forming an oxide on a surface of the metal, reducing a part of or all of the oxide by a chemical method or an electrical method, and more desirably performing a nickel plating. The positive electrode current collector or the negative electrode current collector, for purposes of improving the adhesiveness of the current collectors with positive electrode active material or negative electrode active material, has preferable charge-discharge cycle characteristics, because neither a falling out nor a break away of the positive electrode active material or the negative electrode active material occurs as a result of the charge-discharge operation.

In order to strengthen the surface of the base metal of the current collector, a metallic film is desirably formed on the surface of the base metal by plating after roughening the surface. The metallic film is desirably made of a metal such as cobalt, nickel, and the like, which is flexible and harder than the base metal. A metallic film is desirable from the point of view of increasing the adhesiveness in forming the positive electrode active material and the negative electrode active material by preventing flattening during the fabrication with pressing, and for purposes of increasing the corrosion resistance of the surface of the aluminum and copper. The thickness of the metallic film is desirably in the range of 0.01–1 $\mu$m.

The negative electrode active material can be in the form of particles, which are capable of absorbing and desorbing lithium ions, and examples of such materials are as follows: graphite group, amorphous carbon group, pyrocarbon group, cokes group, carbon fiber, metallic lithium, lithium alloys. (Li—Al, Li—Pb, etc.), inorganic compounds (carbide, oxide, nitride, boride, halide, intermetallic compounds, etc.), and intermetallic particle compounds such as aluminum, tin, and the like.

The above materials, other than the metals, have desirably an average particle diameter in the range of 5–30 $\mu$m, and in particular, are preferably in the range of 10–20 $\mu$m. Because small particles are harmful to the characteristics, the minimum size of the particles is 5 $\mu$m or more, and the maximum size is 50 $\mu$m or less. The metallic powder is effective to increase the conductivity of the film, and its average diameter is desirably in the range of 0.1–100 $\mu$m, and more desirably in the range of 1–50 $\mu$m. The graphite desirably contains rhombohedral crystal of 20% or less by weight, and, in particular, a range of 5–15% by weight is desirable.

For positive electrode active material, a complex oxide such as, lithium.cobalt oxide ($Li_xCoO_2$), lithium nickel oxide ($Li_xNiO_2$), lithium manganese oxide ($Li_xMn_2O_4$, $Li_xMnO_3$) lithium nickel cobalt oxide ($Li_xNi_y$, $Co_{(1-y)}O_2$), and the like, is usable. The above materials have desirably an average particle diameter in the range of 5–30 $\mu$m, and, in particular, the same size as the negative electrode active material, other than metals, is desirable.

For the separator, a microporous polymer resin film such as nylon, cellulose, nitrocellulose, polysulfone, polyacryronitrile, polyvinylidene fluoride, polypropylene, polyethylene, and polyolefin group can be used.

For the electrolyte, lithium hexafluorophosphate ($LiPF_6$), $LiBF_4$, $LiClO_4$, and the like are used. The content of these materials is desirably in the range of 0.2–5 mol/l and more desirably in the range of 0.5–3 mol/l.

For a conducting material used as the negative electrode active material or the positive electrode active material, flaky graphite, massive amorphous carbon, and massive graphite are desirable. Their average particle diameter is desirably equal to or less than 10–30 $\mu$m, and the specific surface area is desirably in the range of 2–300 m$^2$/g, more desirably, it is in the range of 15–280 m$^2$/g.

Short carbon fiber 5–10 $\mu$m in diameter and 10–30 $\mu$m in length can be used desirably. In particular, the massive graphite has a preferable adhesiveness.

The negative electrode active material or the positive electrode active material contains a resin of 2–20% by weight, and is combined to the surface of the current collector by the resin. For the resin, polyvinylidene fluoride is used.

The aprotic organic electrolyte secondary battery relating to the present invention has a negative electrode current collector, the surface of which is appropriately roughened, and the adhesion strength of the current collector with the negative electrode mixture containing the negative electrode active material and the resin can be increased, because an anchor effect of the roughened surface of the negative electrode current collector is larger in comparison with that of a negative electrode current collector having a smooth surface.

Therefore, falling out and break away of the negative electrode mixture which tend to occur during expansion and shrinkage of the negative electrode active material during a charge-discharge operation can be prevented, and charge-discharge cycle characteristics of the aprotic organic electrolyte secondary battery can be improved.

The lithium batteries relating to the present invention can be formed in various shapes, such as a cylindrical shape, a coin shape, a rectangular shape, and the like, and they can be used in various portable electronic apparatus having a rating from several watt-hours to hundreds of watt-hours. In particular, the lithium batteries can be used for notebook type personal computers, note type word processors, palm top (pocket) personal computers, portable telephones, PHSS, portable facsimiles, portable printers, headphone stereo players, video cameras, portable TVs, portable CDs, portable MDs, electric shavers, electronic note books, transceivers, electric tools, radios, tape recorders, digital cameras, portable copiers, and portable game machines. And further, the lithium batteries can be used in electric vehicles, hybrid vehicles, automatic vending machines, electric carts, energy storage systems for load levelling, energy storage devices for home appliances, dispersed type energy storage systems (built in installed electric apparatus), energy supply systems for emergency, and others.

DETAILED DESCRIPTION OF THE PREFERRED EMBODIMENTS

The present invention is not restricted by the following embodiments.

Embodiments 1–9, Comparative examples 1, 2

Figure 1:
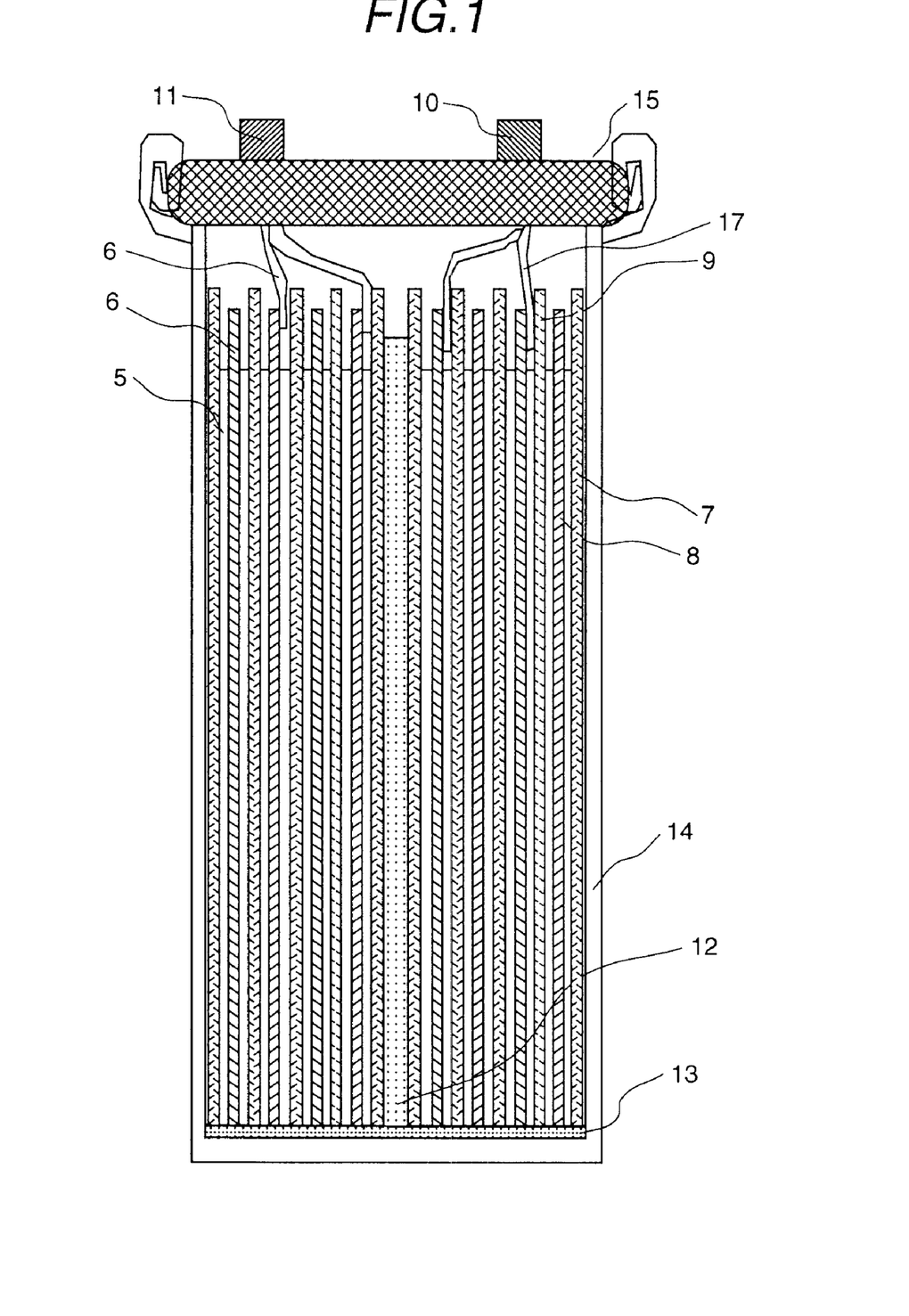
FIG. 1 is a cross section of the lithium secondary battery relating to the present embodiments 1 to 9.

FIG. 1 is a vertical. cross section of a lithium secondary battery representative of the present embodiments.

Figure 2:
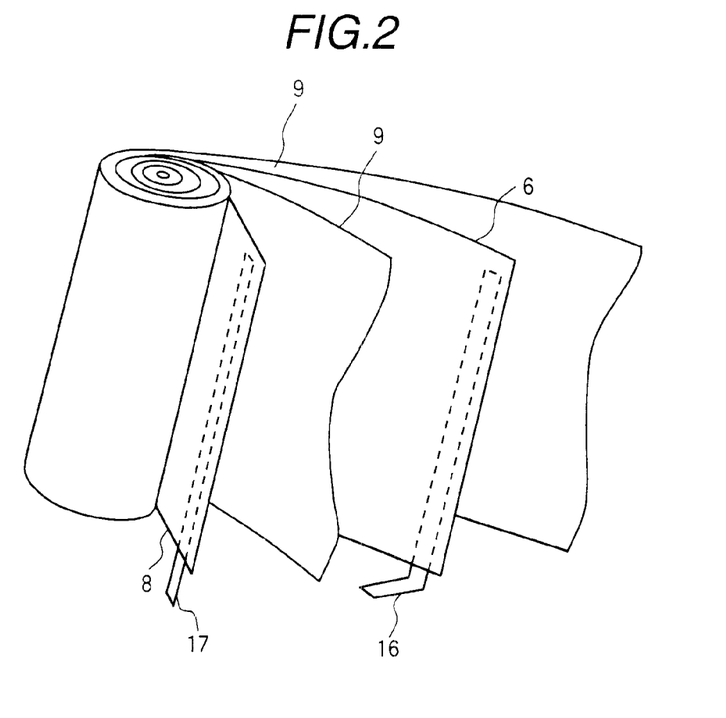
FIG. 2 is a perspective view showing the assembling of the positive electrode, the negative electrode, and the separator of the lithium secondary battery relating to the present invention.
Figure 3:
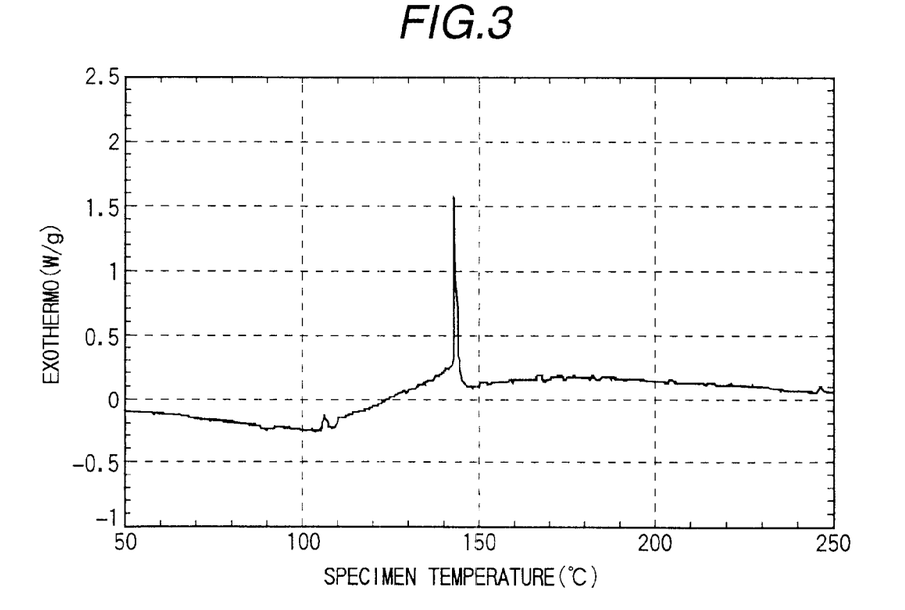
FIG. 3 is a graph indicating a relationship between the temperature of the specimen and calories.

In accordance with the embodiment 1, hard carbon was used as a negative electrode active material layer 5, polyvinylidene fluoride (hereinafter, called as PVDF) was used as a binder, and a negative electrode was obtained by applying a paste made by dissolving the above materials into N-methylpyrrolidone (hereinafter, called as NMP) onto both sides of a copper foil negative electrode current collector 6 of 20 μm thick, which was then heated, and pressed for fabrication. $LiMn_2O_4$ was used as a positive electrode active material 7, PVDF was used as a binder, amorphous carbon was used as a conductive assistant agent, and a positive electrode was obtained by applying a paste made by dissolving the above materials into NMP onto both sides of an aluminum foil positive electrode current collector 8 of 20 μm thick, followed by heating and pressing for fabrication. A battery of 54 mm in outer diameter and 200 mm in height was prepared by: fixing tabs 16, 17 for taking out current at an end of the positive electrode and the negative electrode by welding with an equal interval; winding these electrodes with separators 9, each of which was interposed in each of intervals between these electrodes as indicated in FIG. 2; connecting the tabs with a battery lid 15 having electrode terminals 10, 11; inserting the battery lid into the battery can 14; injecting an electrolyte into the battery; and fixing the battery lid 15 to the battery can 14 by caulking. In accordance with the embodiment 1, the electrolyte was prepared by dissolving $LiBF_4$ at 1 mol/l as a lithium salt into a solution, which was prepared by mixing propylene carbonate (hereinafter, called PC) with ethylmethyl carbonate (hereinafter, called EMC) and 1,3-propylene carbonate at 60:30:10 by volume and further by dissolving iodine at 5% by weight into the solution, as indicated in Table 1. The amount of the electrolyte injected into the battery was approximately 85 ml.

Similarly, the batteries of the embodiments 2–9 and the comparative examples 1, 2 were prepared as indicated in Table 1.

The battery characteristics of the batteries prepared as indicated above were evaluated by measuring a first discharge capacity with a passing current of 10 A, and a discharge capacity after continuously repeating charge-discharge cycle tests 300 times while setting a discharge utilizing rate at 70%. As safety tests, heating tests using a burner of a gas furnace were performed, because a large battery has a large amount of electrolyte and the danger from throwing the battery into a fire was deemed to be the highest danger. The results of the above evaluation and tests are summarized in Table 1.

TABLE 1

| Emb./Com.[1]) | Electrolyte | Electrolyte/additive |
|---|---|---|
| Emb. 1 | PC:EMC:1,3-propylene carbonate = 60:30:10 | $LiBF_4$ = 1 M, Iodine = 5 wt. %[2]) |
| Emb. 2 | PC:EMC:1,3-propylene carbonate = 60:30:10 | $LiPF_6$ = 1 M, Iodine = 5 wt. % |
| Emb. 3 | PC:EMC:1,3-propylene carbonate = 60:30:10 | $LiPF_6$ = 1 M, Lithium iodide = 2 wt. % |
| Emb. 4 | PC:EMC:1,3-propylene carbonate = 60:30:10 | $LiBF_4$ = 1 M, Triphenyl phosphate = 5 wt. % |
| Emb. 5 | PC:EMC:diphenyl carbonate = 60:30:10 | $LiBF_4$ = 1 M |
| Emb. 6 | PC:EMC:diphenyl carbonate = 60:30:10 | $LiPF_6$ = 1 M |
| Emb. 7 | PC:EMC:1,4-butylene sulfate = 60:35:5 | $LiBF_4$ = 1 M |
| Emb. 8 | PC:EMC:1,4-butylene sulfate = 60:35:5 | $LiPF_6$ = 1 M |
| Emb. 9 | EMC:1,3-propylene carbonate = 65:35 sulfate = 60:35:5 | $LiPF_6$ = 1 M, Iodine = 2 wt. % |
| Com. 1 | PC:EMC = 60:30 | $LiPF_6$ = 1 M |
| Com. 2 | PC:EMC = 60:30 | $LiBF_4$ = 1 M |

| Emb./Com.[1]) | First discharge capacity (Ah) | 300th discharge capacity (Ah) | Results of burner tests. |
|---|---|---|---|
| Emb. 1 | 19.5 | 16.8 | No ignition |
| Emb. 2 | 19.6 | 16.4 | No ignition |
| Emb. 3 | 19.5 | 16.3 | No ignition |
| Emb. 4 | 19.6 | 16.3 | No ignition |
| Emb. 5 | 19.4 | 16.5 | No ignition |
| Emb. 6 | 19.6 | 16.6 | No ignition |
| Emb. 7 | 19.4 | 16.4 | No ignition |
| Emb. 8 | 19.5 | 16.3 | No ignition |
| Emb. 9 | 19.6 | 16.7 | No ignition |
| Com. 1 | 19.6 | 16.7 | Ignition |
| Com. 2 | 19.4 | 16.6 | Ignition |

Remarks:
[1])Emb./Com.: Embodiment/Comparative example
[2])wt. %:% by weight

As indicated in Table 1, the electrolyte burst forth from the batteries of the comparative examples 1 and 2, wherein conventional electrolyte was used, 4–5 minutes after igniting the burner in the furnace, and this caused combustion by catching fire from the flame produced by the burner. The combustion continued for approximately 20 minutes. On the contrary, the electrolyte of the batteries obtained in the embodiments 1–9, wherein an electrolyte having the thermal self solidifying effect of the present invention was used, were all solidified, and so no ignition of the electrolyte resulted.

The conductivity of the electrolyte of the embodiment 9 was 9 mS/cm. The reactivity of the electrolyte was evaluated by differential scanning calorimetry (DSC). The result is indicated in FIG. 2. The electrolyte initiated its reaction at approximately 140° C., and heat was generated. The specimen after the test was solidified. Therefore, the electrolyte was confirmed to be solidified at approximately 140° C.

Embodiment 10

Figure 4:
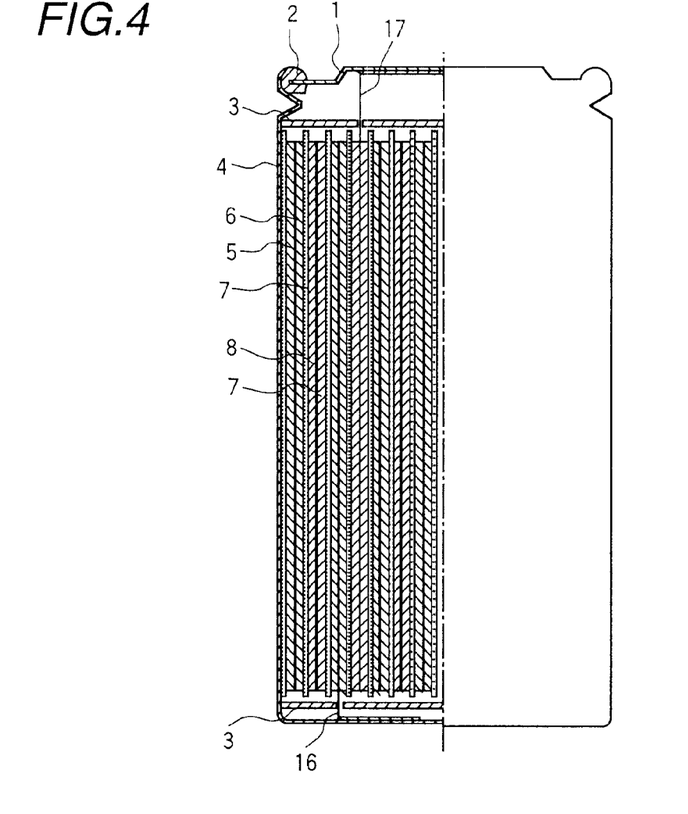
FIG. 4 is a partial vertical cross section of the lithium secondary battery relating to the embodiment 10.

The lithium secondary battery of the present invention, as illustrated in FIG. 4, was prepared similarly, as follows. A slurry of a positive electrode mixture was prepared by mixing $LiCoO_2$ as the positive electrode active material, acetylene black at 7% by weight as a conductor, polyvinylidene fluoride (PVDF) at 5% by weight as a binder, and N-methyl-2-pyrrolidone.

Similarly, a slurry of a negative electrode mixture was prepared by mixing graphite powder having an arbitrary content of rhombohedral crystalline in the range of 5–20% by weight and hexagonal crystalline of at least 80% by weight as the negative electrode active material, PVDF of 10% by weight as a binder, and N-methyl-2-pyrrolidone. The graphite powder had an average particle diameter of 25 μm, and the amount of the rhombohedral crystalline was adjusted by varying the heating time at 2850° C.

The positive electrode mixture was applied onto both side planes of an aluminum foil of 25 μm in thickness, and then, it was dried in a vacuum at 120° C. for one hour. After drying in a vacuum, the electrode was fabricated by pressing it with a roller press to make the electrode 195 μm in thickness. The amount of the applied mixture per unit area was 55 mg/cm$^2$, and the positive electrode was prepared by cutting out the electrode to 40 mm in width and 285 mm in length. However, the regions 10 mm in from both ends of the positive electrode were not applied with the positive electrode mixture and the aluminum foil was exposed, and a positive electrode tab was fixed onto one of these end regions by ultrasonic welding.

On the other hand, the negative electrode mixture was applied onto both side planes of a copper foil of 10 μm in thickness, which was rolled and treated by a reducing process after oxidation treatment, as will be explained later, and then, it was dried in a vacuum at 120° C. for one hour. After drying in a vacuum, the electrode was fabricated by pressing it with a roller press to make the electrode 175 μm in thickness. The amount of the applied mixture per unit area was 25 mg/cm$^2$, and the negative electrode was prepared by cutting out the electrode to 40 mm in width and 290 mm in length. The regions 10 mm in from both ends of the negative electrode were not applied with the negative electrode mixture or the positive electrode mixture, and the copper foil was exposed, and a negative electrode tab was fixed onto one of these end regions by ultrasonic welding.

For the separator, a microporous film made of polypropylene of 25 μm in thickness and 44 mm in width was used.

The positive electrode, the separator, and the negative electrode were overlapped in the order as described above, and an electrode group was prepared by winding the overlapped members as illustrated in FIG. 2. The electrode group was inserted into a battery can, the negative electrode tab was welded to the bottom of the battery can, and a reduced area portion was formed in order to allow for caulking of a positive electrode lid. An electrolyte was prepared by mixing lithium phosphate hexafluoride of 1 mol/l with a mixed solvent of ethylene carbonate, diethylcarbonate, and 1,3-propylene carbonate at a rate of 45:45:10 by volume, and further by mixing iodine of 2% by weight to the total amount of the electrolyte, which was then poured into the battery can. Then, a positive electrode tab was welded to the positive electrode lid, and a battery was assembled by caulking the positive electrode lid to the battery can. The battery can 14 was made of austenitic stainless steel, such as SUS 304, and SUS 316.

In testing, the prepared battery, a number of charge-discharge cycles were repeated with a charge-discharge current of 300 A and charge-discharge voltages of 4.2 V and 2.8 V, respectively. A rapid charge-discharge was performed while varying the charging current in the range from 300 mA to 900 mA.

Copper plates as rolled were used for the following tests in a condition of a tough pitch copper of 0.1 mm in thickness and 100 mm square. The surface of the copper plate was treated by an oxidation process, and subsequently by a reducing process.

The copper plate was degreased under the following conditions and, subsequently, it was washed with water.

| | |
|---|---|
| C4000 | 50 g/l |
| liquid temperature | 55° C. |

Then, the copper plate was treated with the following mixture, and, subsequently, it was washed with water.

| | |
|---|---|
| ammonium disulfate [$(NH_4)_2S_2O_4$] | 200 g/l |
| sulfuric acid ($H_2SO_4$) | 5 ml/l |
| liquid temperature | 30° C. |

Then, the copper plate was washed with the following acid, and, subsequently, it was washed with water.

| | |
|---|---|
| sulfuric acid ($H_2SO_4$) | 3 ml/l |

Then, the copper plate was treated with the following mixture for oxidation treatment to deposit copper oxide onto the copper plate surface.

| | |
|---|---|
| sodium chlorate ($NaCl_3O$) | 109 g/l |
| sodium phosphate ($Na_3PO_4.12H_2O$) | 30 g/l |
| sodium hydroxide (NaOH) | 15 g/l |
| liquid temperature | 75° C. |

After washing it with water, the copper plate was treated with the following mixture for effecting a reducing treatment.

| | |
|---|---|
| dimethylamine borane [$(CH_3)_2NHBH_3$] | 6 g/l |
| sodium hydroxide (NaOH) | 5 g/l |
| liquid temperature | 45° C. |

Then, the copper plate was washed with pure water, and it was dried with hot air. Each of the above treatments was performed by immersing the plate into an agitated solution at a designated time.

The C4000 is an agent for cleaning the surface of the copperplate after rolling, while sodium hydroxide is added in order to make the pH of the solution in the range of 11–13, and a surface active agent is also added. The ammonium disulfate is added for dissolving the surface of the copper plate, and the sulfuric acid is added for dissolving copper oxide.

The treated surface conditions could be controlled by time, temperature, and the concentration of the solution for the oxidation treatment, and various specimens were prepared by varying the treating time. The treating times were 60 seconds, 120 seconds, and 300 seconds. The surface of the copper plate after the treatment was observed with a scanning electron microscope, and the fact that the surface of the copper plate became coarser with an increase in the oxidation treating time was confirmed from the result of the observation. An effective surface area was obtained by measuring the specific surface area by a BET method using Kr gas. The ratios of the effective surface area to the apparent surface area of the copper plate are indicated in Table 2.

TABLE 2

| No. | Oxidation treating time (sec.) | Effective surface area/ apparent surface area |
| --- | --- | --- |
| 1 | 0 | 0.7 |
| 2 | 60 | 3.3 |
| 3 | 120 | 6.5 |
| 4 | 300 | 12.4 |

The sample No. 1 is a blank sample using the copper plate as rolled without performing any treatment thereon.

Table 2 indicates that the surface roughening of the copper plate is increased with an increase in the oxidation treating time. The blank test on sample No. 1 indicates a ratio of effective surface area/apparent surface area of less than 1, because of an experimental error in measuring the specific surface area by the BET method. Accordingly, each of the ratios shown in Table 2 can be deemed to contain an error of as much as the ratio indicated for sample No. 1.

The effective surface area increase approximately linearly with an increase in the oxidation treating time, and the ratio of the effective surface area becomes three times or more in one minute and the ratio indicates a trend to increase more gradually after 200 seconds.

In accordance with the present embodiment, the surface of the copper plate after oxidation treatment for 300 seconds was observed with an electron microscope, and formation of whisker oxide of a 1–30 nm in diameter and 50–200 nm in length was confirmed. In accordance with a subsequent reducing treatment, rods of 100–500 nm in length were formed and stood with an intertwining rod shaped coating film 5–20 nm in diameter relative to each other on the surface of the whisker oxide. The diameter and the length of the rods vary depending on the length of the treating time.

Next, the adhesiveness of the copper plate with the particles will be explained hereinafter.

As the particles, flaky graphite having an average diameter of approximately 25 μm, massive amorphous carbon having an average diameter of approximately 15 μm, and aluminum powder having an average diameter of approximately 30 μm were used. A slurry was prepared by kneading each of the particles with N-methylpyrrolidone solution dissolving polyfluorovinylidene (PVDF). The slurry was applied onto the copper plate indicated in Table 2. The ratio of each of the particles to the PVDF in the slurry was particles:PVDF=90:10 by weight. The copper plate with the applied slurry was dried in the atmosphere, pressed with a pressure of 500 kg/cm² in order to increase the density of the film, and then dried in a vacuum at 120° C. The copper plate with the adhered particles as prepared by the above steps was cut out to make the particle covered surface area 4 cm², and commercial adhesive tape was adhered so as to cover all the particle covered surface of the copper plate. The adhesiveness of the particles on the copper plate was evaluated according to the ratio of separated particles when the adhesive tape is peeled off from the surface of the copper plate. The result is indicated in Table 3.

TABLE 3

| | Ratio of separated particles when peeling off the adhesive tape from the copper plate (% by weight) | | |
| --- | --- | --- | --- |
| No. | Flaky graphite | Massive amorphous carbon | Aluminum |
| 1 | 75 | 99 | 99 |
| 2 | 28 | 35 | 13 |
| 3 | 34 | 17 | 15 |
| 4 | 34 | 19 | 13 |

In accordance with Table 3, the smaller the ratio of separated particles is when peeling the adhesive tape from the surface of the copper plate, the better the adhesiveness of the copper plate with the particles is. Accordingly, the copper plate having a surface which was roughened by treating it with an oxidation process and a reducing process, had a better adhesiveness than the copper plate as rolled. Although the adhesiveness varies depending on the kind and size of the particles, the adhesiveness of the surface roughened copper plate was clearly improved in comparison with the copper plate as rolled.

That is, in the relationship between the ratio of the separated particles and the ratio of effective surface area/ apparent surface area, the ratios of the separated particles of the flaky graphite and aluminum powder were saturated when the ratio of effective surface area/apparent surface area was 2 or more, and the values were decreased to 35% or less for the former and 15% or less for the latter.

Embodiment 11

Figure 5:
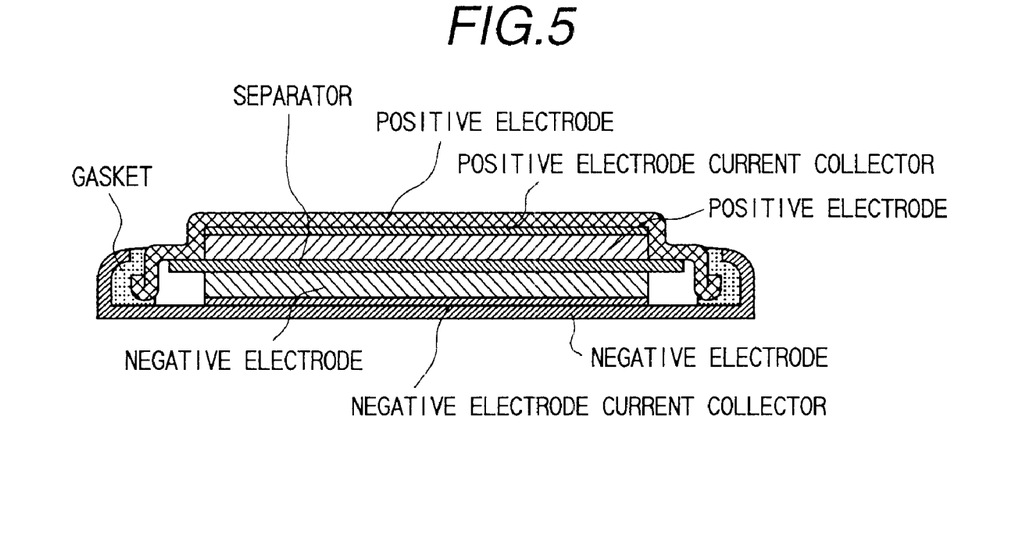
FIG. 5 is a vertical cross section of a coin type lithium secondary battery relating to the embodiment 11.

FIG. 5 is a cross sectional view of a coin type battery relating to the present invention. The current collectors used for the positive electrode and the negative electrode, and the positive electrode mixture and the negative electrode mixture of the present embodiment, were prepared in the same way as the embodiment 10. The negative electrode was a pellet 14.5 mm in diameter, and 0.4 mm in thickness. The positive electrode was a pellet 14.5 mm in diameter and 0.9 mm in thickness. As indicated in FIG. 5, the positive current collector was fixed to the inner bottom of the positive electrode can by welding, a gasket made of insulating packing was placed thereon, and the positive electrode was pressure welded to the positive electrode can. A separator made of microporous polypropylene was placed thereunder, and an electrolyte was impregnated into the separator. The electrolyte was prepared by dissolving $LiPF_6$ at 1 mol/l into a mixed solvent of ethylene carbonate, propylene carbonate, diethylcarbonate, and 1,3-propylene carbonate at a ratio of 30:15:45:10 by volume, and by further dissolving iodine at 2% by weight to the total weight of the solution into the solution. On the other hand, a negative electrode current collector was welded to the inner plane of the negative electrode can 4, and tho negative electrode was pressure welded to the negative electrode current collector. Then, the negative electrode was placed on the separator, and the positive electrode can and the negative electrode can were caulked together via the gasket to form the coin type battery.

Embodiment 12

The positive electrode active material used in the present embodiment was $LiCoO_2$ powder having an average particle diameter of 10 μm. A positive electrode slurry was prepared by kneading sufficiently the positive electrode active material, natural graphite, and 1-methyl-2-pyrrolidone solution of polyfluorovinylidene. The mixing ratio of LiCoO$_2$:natural graphite: polyfluoro-vinylidene was 90:6:4 by weight. The slurry was applied onto the positive electrode current collector made of aluminum foil of 20 μm in thickness by a doctor blade method. The positive electrode had a rectangular shape and was 70 mm in height and 120 mm in width. The positive electrode was dried at 100° C. for 2 hours.

The negative electrode was manufactured as follows. The negative electrode slurry was prepared by mixing natural graphite powder having an average particle diameter of 5 μm with polyfluorovinylidene in the ratio of 90:10 by weight, and by kneading the mixture with 1-methyl-2-pyrrolidone added as an organic solvent. The slurry was applied onto the surface of the negative electrode current collector made of copper foil of 10 μm in thickness as rolled by a doctor blade method. The surface of the copper foil was treated under the same conditions as the embodiment 4. The negative electrode had a rectangular shape and was 70 mm in height and 120 mm in width. The negative electrode was dried at 100° C. for 2 hours.

Figure 6:
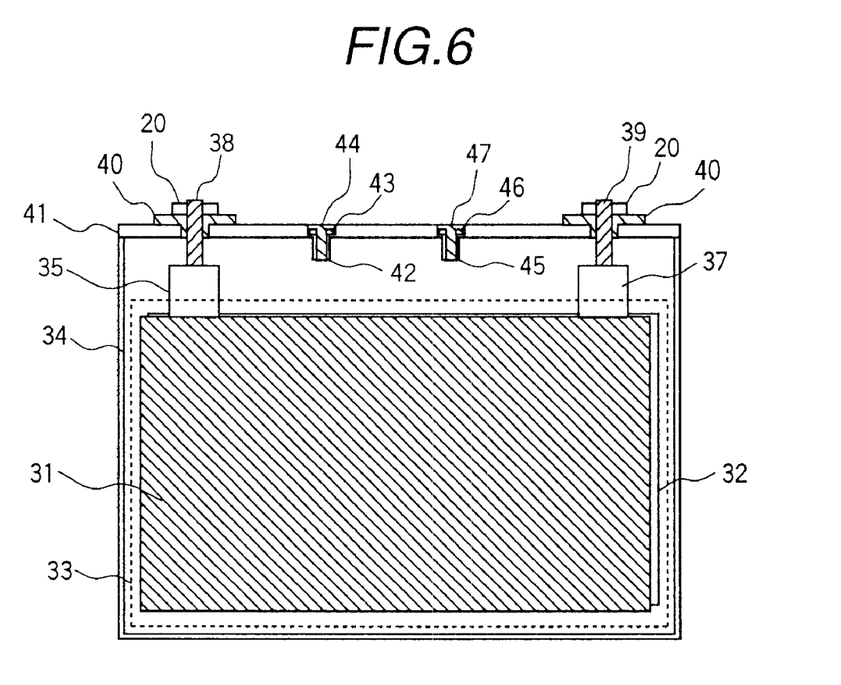
FIG. 6 is a vertical cross section of the rectangular type lithium secondary battery relating to the embodiment 12.

FIG. 6 is a cross sectional view of the rectangular type lithium secondary battery of the present invention. The outer size of the battery was 100 mm in height, 130 mm in width, and 30 mm in depth. An electrode group was formed by laminating alternately the positive electrodes 31 and the negative electrodes 32, each of which was inserted into a separator 33 manufactured in a bag shape, and the electrode group was inserted into a battery can 34 made of aluminum. Each positive electrode lead 35 and negative electrode lead 37 welded to an upper portion of each electrode was connected to each positive electrode terminal 38 and negative electrode terminal 39, respectively. Each positive electrode terminal 38 and negative electrode terminal 39 was inserted into a battery lid 41 via a packing 40 made of polypropylene. The battery can be connected to external cables by nuts 20 attached to the positive electrode terminal 38 and the negative electrode terminal 39. The battery lid 41 was provided with an electrolyte inlet and a safety valve for releasing gases which have accumulated inside the battery when the pressure inside the battery reaches 4–7 atmospheres. The safety valve comprises a gas release outlet 42, an o-ring 43, and a sealing bolt 44. The electrolyte inlet comprises a pouring hole 45, an o-ring 46, and a sealing bolt 47. After welding the battery can 34 and the battery lid 41 using a laser, the electrolyte was poured into the battery through the pouring hole 45, and the pouring hole 45 was sealed by the sealing bolt 47 to complete the lithium secondary battery. The electrolyte that was used was a mixed solvent of 1 liter of ethylene carbonate, dimethyl carbonate, and 1,3-propylene carbonate in a ratio of 45:45:10 by volume dissolving lithium phosphate hexafluoride (LiPF$_6$) 1 mol and iodine 5% by weight.

Electrochemical energy of the battery can be taken out and recharged through the positive electrode terminal 38 and the negative electrode terminal 39. An average discharge voltage of the battery is 3.7 V, and the rated capacity is 27 Ah, and 100 Wh.

Figure 7:
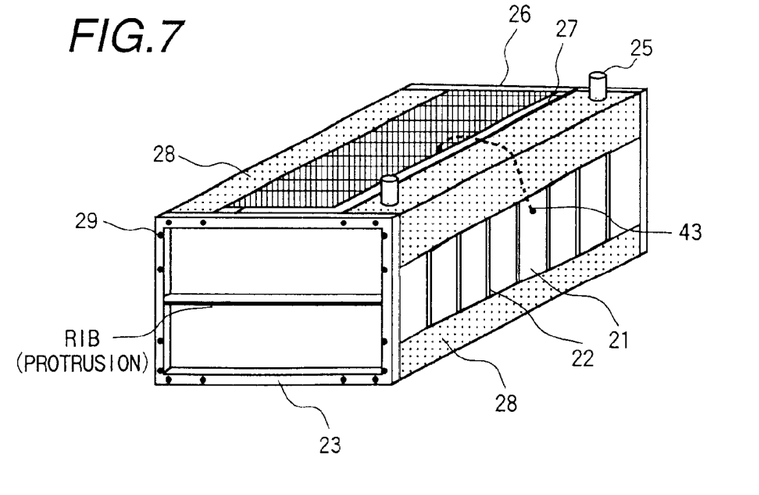
FIG. 7 is a perspective view of the assembled batteries relating to the embodiment 12.

A battery assembly of 8 batteries connected in series, as illustrated in FIG. 7, was assembled by aligning the above rectangular lithium secondary batteries 21 in a row so that their side plane y of 100 mm in height and 130 mm in width faced each other and their lids 11 were oriented upwards.

In accordance with the present invention, the thickness of the spacer was restricted to less than 10% of the battery thickness, in order to maintain a decreasing rate of the volume energy density of the battery assembly by using the spacer approximately 10%. Because the battery 21 had a thickness of 30 mm, two spacers 22 made of polytetrafluoroethylene of 10 mm in thickness, 10 mm in width, and 100 mm in length were inserted in each of the intervals between the facing planes of the batteries in a direction along the height of the battery 21. The rectangular lithium secondary battery 21 was tightened so as to be pressurized inwards by fixing metallic plates 23 made of stainless steel and fixing members 28 made of polytetrafluoroethylene attached at the side planes, front plane, and rear plane of the battery assembly with bolts 29. In order to rapidly release heat from the battery outwards, a rib shaped protrusion was formed on the metallic plate 23 made of stainless steel. The positive electrode terminals and the negative electrode terminals of each of the rectangular lithium secondary batteries were connected with current cables so that all the batteries were connected in series, and they were further connected to the positive electrode terminal 24 and the negative electrode terminal 25 of the battery assembly. Furthermore, the positive electrode terminal and the negative electrode terminal of each of the batteries 21 were connected to a control circuit board 26 with the positive electrode voltage input cable and the negative electrode voltage input cable, respectively, in order to make it possible to measure the voltage and current of each battery 21 for controlling the charge-discharge of the battery assembly. The control circuit board 26 was provided with microcomputer chips, and had a function to terminate the charge-discharge operations of the battery assembly when any one of the voltage and the current of at least one of the batteries 21 went out of a designated range. The control circuit board of the present invention was a flame retardant board improved in safety, because the circuit elements were connected using a printed circuit board made of an epoxy resin to which was added glass fibers and hexabromobenzene 1%, and the wiring cable was coated with polytetrafluoroethylene. A thermocouple 43 was attached to the side plane of the fourth battery from the end of the row for transmitting a temperature signal to the control circuit board 26, in order to terminate the charge-discharge operations of the battery when the temperature of the battery exceeded a setting temperature. In accordance with the present embodiment, the control circuit board 26 was provided on the battery assembly. Therefore, a shielding plate 27 was inserted between the control circuit board 26 and the battery 21, in order to prevent the electrolyte released from the gas release outlet 42 from contaminating the control circuit board 26. An average discharge voltage of the battery assembly is 29.6 V, and the rated capacity is 27 Ah, and 800 Wh. The battery assembly of the present embodiment will be expressed as B1, hereinafter. Because the battery assembly of the present invention does not require any external vessel, the rectangular lithium secondary battery 21 can be cooled directly with outside air, and a temperature rise of the battery at the time of rapid charge or discharge under a high loading can be decreased.

In accordance with the above explanation, the electrode group was a laminated type using rectangular shaped electrodes. However, a similar battery assembly can be composed of a wound type electrode group using flat and oblong shaped electrodes.

Embodiment 13

Figure 8:
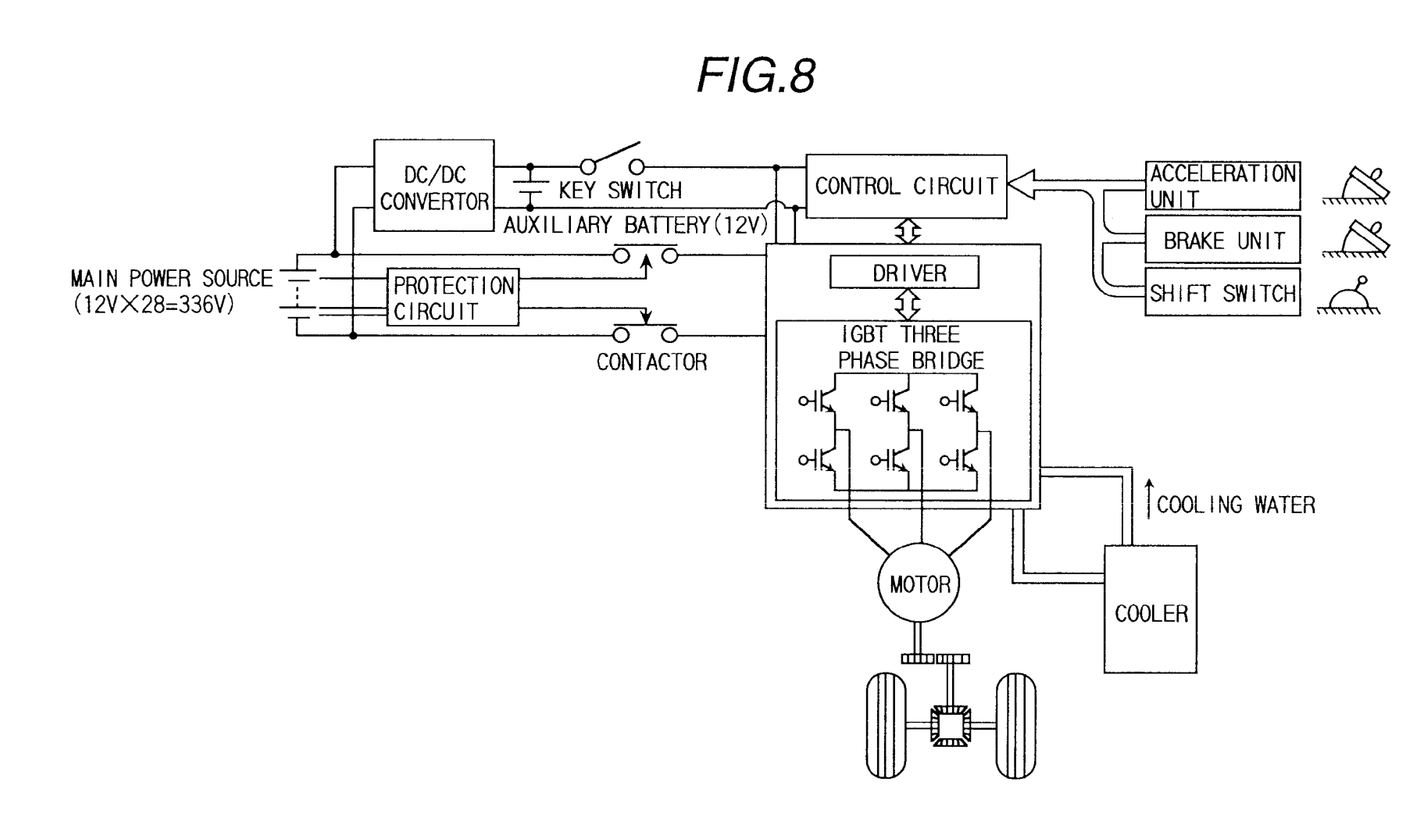
FIG. 8 is a schematic diagram of the driving system of an electric vehicle relating to the embodiment 13.

FIG. 8 is a diagram indicating the composition of the driving system of an electric vehicle using a lithium secondary battery as described in the above embodiments 1–12.

In accordance with the driving system of the electric vehicle of the present embodiment, when a key switch is turned on and the accelerator depressed, the torque or rotation of the motor can be controlled according to the angle of the accelerator, as in ordinary gasoline engine driven cars. When the accelerator is returned to its original position, a regenerative braking equivalent to engine braking is started, and when the brake pedal is depressed deeply, the regenerative braking force is increased further. Switching between going forward or backward is performed by a shift lever signal, and the transmission gear ratio is set at all times to a fixed value. An IGBT vector control invertor system using an induction motor was adopted as a control system, and the power source voltage was selected as 336 V in consideration of the IGBT withstand voltage. In accordance with the present embodiment, the output was determined as the maximum output 45 kW, the maximum torque 176 N.m in consideration of dynamic performance (acceleration, grade ability) of the vehicle, and rated output was determined as 30 kW in consideration of the specification of the maximum velocity. Main control items included a fail safe control, in addition to controlling the forward and backward movement of the vehicle, and regenerative braking.

With a decrease in the size and weight of motors, the thermal density is increased. Therefore, providing effective cooling structures becomes important. If an ordinary air cooling type arrangement is adopted, the temperature of the motors would be increased. Therefore, a liquid cooling type similar to that used in general engines was adopted. Coolant paths were provided in the frame, made of aluminum, covering the body of the motor itself, and an optimum shape was determined by temperature rise simulation. The coolant entered into the coolant paths through an inlet for the coolant at the frame, it was released from the frame after absorbing the heat generated by the motor itself, and it was then cooled by a radiator installed in the circulating path of the coolant. In accordance with the liquid cooling arrangement as described above, the cooling performance could be increased approximately three times in comparison with an air cooling arrangement.

IGBT are used as power elements in the invertor, and heat of several kW at maximum is generated with maximum output. Additionally, heat is generated from a resistance for absorbing surge, a filter condenser, and other elements. Therefore, effective cooling to maintain these members below the maximum allowable temperature is necessary. Particularly, cooling of the IGBT is a problem, and air-cooling, water cooling, oil cooling, and other cooling systems can be considered for this purpose. Here, a forced water cooling system, which was readily operable and available for providing effective cooling, was adopted.

Figure 9:
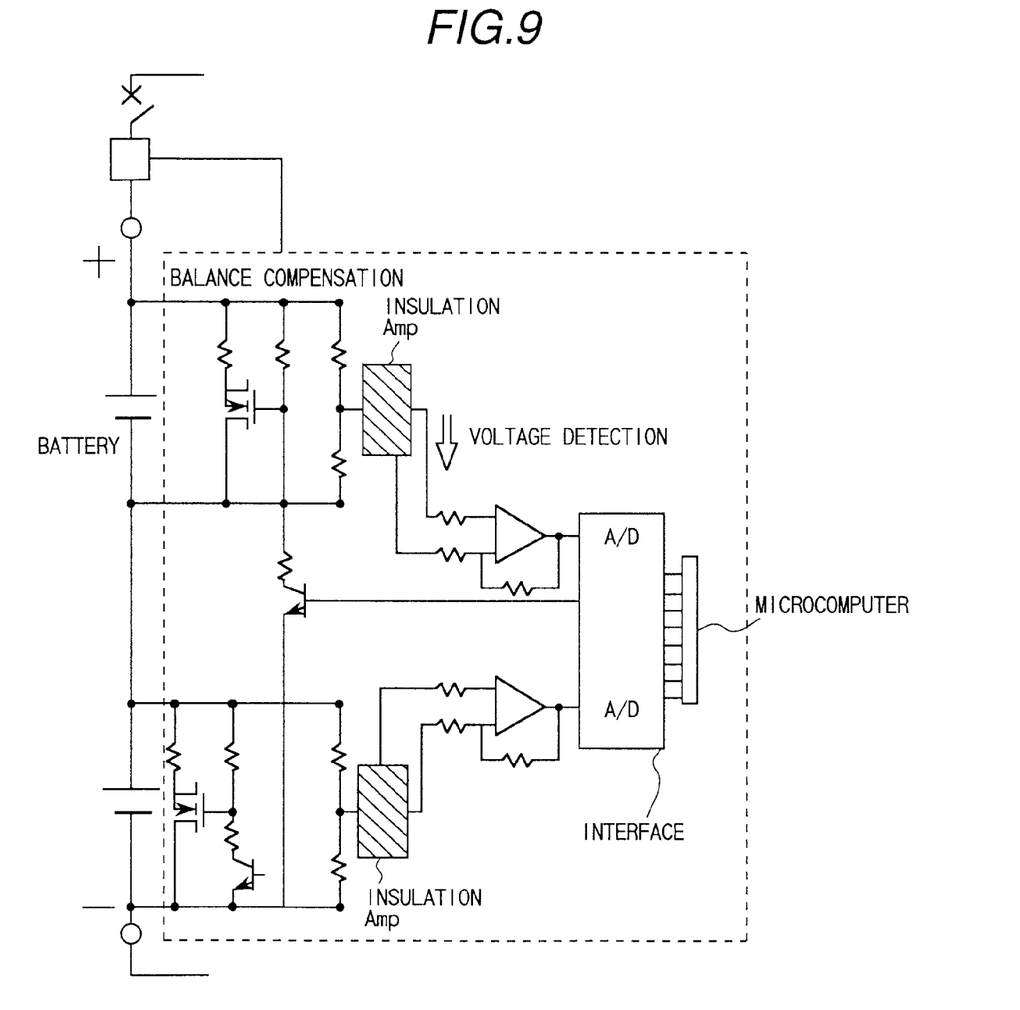
FIG. 9 is a schematic circuit diagram of the protecting circuit for the lithium secondary battery.

A protection circuit indicated in FIG. 9 is composed for the lithium secondary battery as a power source in the present embodiment. The protection circuit is provided to protect the battery from over-charging and over-discharging. The protection circuit is composed of balance compensation circuits for adjusting the cell voltage of respective batteries as indicated in FIG. 9, and such a circuit is provided for each of the batteries. The balance compensation circuit can be controlled by a microcomputer. Because the electrolyte of a conventional lithium secondary battery was flammable, a thermister was provided at each of the batteries for monitoring the batteries by detecting the temperature or pressure thereof. However, in accordance with the present embodiment, any special monitoring of the temperature or pressure is made unnecessary, because the electrolyte of the present embodiment does not have a flash point before solidifying itself when an igniting source is brought into close proximity to the electrolyte. Therefore, safety devices as protection circuits could be decreased. The power source is automatically switched off when either an overdischarge or an overcharge condition is detected, as shown in FIG. 8.

Figure 10:
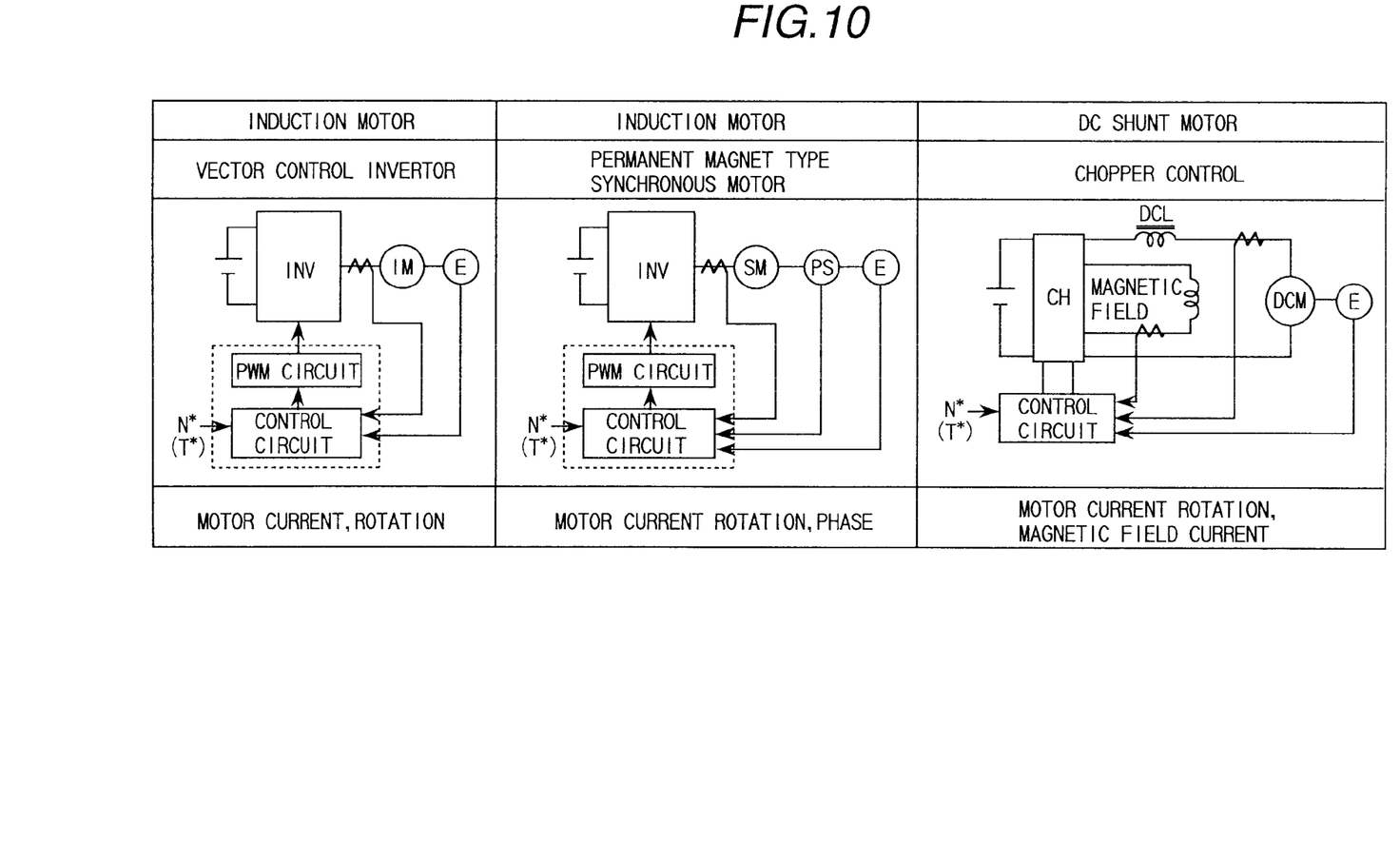
FIG. 10 a diagram indicating compositions of various driving control systems of the electric vehicles relating to the embodiment 13.

In accordance with the present embodiment, an example of an electric vehicle using an induction motor has been described. However, the present invention can be applied additionally to electric vehicles using a permanent magnet type synchronous motor or a DC shunt motor as shown in FIG. 10. In FIG. 10, each of abbreviations has the following meaning: INV (inverter), IM (induction motor), E (encoder), SM (synchronous motor), PS (position sensor), PWM (pulse width modulation), DCM (DC motor), CH (chopper), $N^+$(velocity instruction), and $T^+$(torque instruction). In accordance with FIG. 10, each of the columns indicates a controlling system, a system composition, and main controlling parameters.

Embodiment 14

Figure 11:
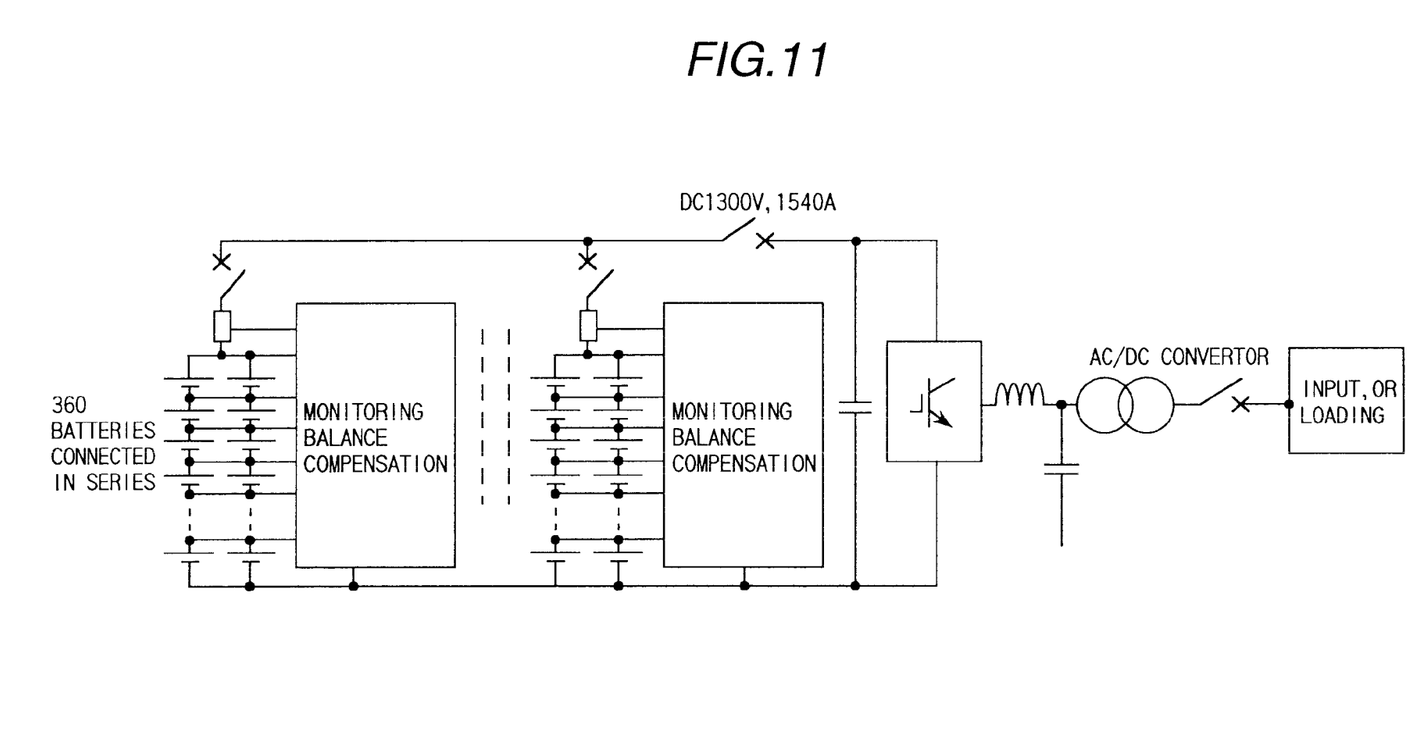
FIG. 11 is a diagram indicating the composition of the electric power storage system relating to the embodiment 14.

FIG. 11 is a schematic circuit diagram indicating the composition of an electric power storage system for night electric power using any of the lithium secondary batteries described in embodiments 1 to 12. In the present example, the electric power storage system is 2000 kW×4 h, and the cell capacity is 1000 Wh. The present example consists of 360 batteries connected in series, with 24 rows being connected being connected in parallel. In accordance with the present embodiment, the batteries must be protected from overdischarge or overcharge in the same way as the embodiment 13, and the protection circuit indicated in FIG. 9 is used as a circuit for monitoring and balance compensation, in order to protect the batteries in the same manner as the previous embodiments.

The present embodiment is aimed at storing a large amount of electric power, but the present embodiment is also effective for air conditioners and an electric water heater for home use.

In accordance with the present invention, safety when the battery is thrown into a fire, which is one of the serious concerns for a large scale lithium secondary battery, can be improved significantly, and significant advantages in obtaining large scale lithium secondary batteries having high safety for home electric power storage and for electric vehicles can be achieved.

What is claimed is:

1. A lithium secondary battery comprising:
   a negative electrode, which is capable of absorbing and desorbing lithium,
   a positive electrode, which is capable of absorbing and desorbing lithium, and
   a non-aqueous electrolyte,
   wherein said non-aqueous electrolyte is formed of a substance such that the non-aqueous electrolyte is solidified by a chemical reaction at a temperature of at least 100° C.,
   wherein said non-aqueous electrolyte is composed of:
     at least a lithium salt and a non-aqueous solvent, and, said non-aqueous solvent comprises:
       a non-aqueous solvent in which said lithium salt is dissolved, and
       a non-aqueous solvent which is polymerized by chemical reaction at a temperature of at least 100° C.,
       wherein said non-aqueous solvent which is polymerized by chemical reaction at a temperature of at least 100° C. is comprised of at least one cyclic carbonate having a six to ten membered ring.

2. A lithium secondary battery comprising:
a negative electrode, which is capable of absorbing and desorbing lithium,
a positive electrode, which is capable of absorbing and desorbing lithium, and
a non-aqueous electrolyte,
wherein said non-aqueous electrolyte is formed of a substance such that the non-aqueous electrolyte is solidified by a chemical reaction at a temperature of at least 100° C.,
wherein said non-aqueous electrolyte is composed of:
at least a lithium salt and a non-aqueous solvent, and, said non-aqueous solvent comprises:
a non-aqueous solvent in which said lithium salt is dissolved, and
a non-aqueous solvent which is polymerized by chemical reaction at a temperature of at least 100°C.,
wherein said non-aqueous solvent which is polymerized by chemical reaction at a temperature of at least 100° C. is comprised of at least one sulfate having a seven to eleven membered ring.

3. A lithium secondary battery comprising;
a negative electrode, which is capable of absorbing and desorbing lithium,
a positive electrode, which is capable of absorbing and desorbing lithium, and
a non-aqueous electrolyte,
wherein said non-aqueous electrolyte is formed of a substance such that the non-aqueous electrolyte is solidified by a chemical reaction at a temperature of at least 100° C.,
wherein the non-aqueous electrolyte is solidified by being polymerized,
wherein the non-aqueous electrolyte includes a polymerization initiator for polymerization of the non-aqueous electrolyte, and
wherein the polymerization initiator lowers initiation temperature of polymerization of the non-aqueous electrolyte, as compared with the initiation temperature of polymerization of a non-aqueous electrolyte with all components of the non-aqueous electrolyte except for the polymerization initiator.

4. A lithium secondary battery comprising:
a negative electrode, which is capable of absorbing and desorbing lithium,
a positive electrode, which is capable of absorbing and desorbing lithium, and
a non-aqueous electrolyte,
wherein said non-aqueous electrolyte is formed of a substance such that the non-aqueous electrolyte is solidified by a chemical reaction at a temperature of at least 100° C.,
wherein said non-aqueous electrolyte is composed of:
at least a lithium salt and a non-aqueous solvent, and, said non-aqueous solvent comprises:
a non-aqueous solvent in which said lithium salt is dissolved, and
a non-aqueous solvent which is polymerized by chemical reaction at a temperature of at least 100° C.,
wherein said non-aqueous solvent in which said lithium salt is dissolved is a five or less-membered cyclic compound, and
wherein said non-aqueous solvent which is polymerized by chemical reaction at a temperature of at least 100° C. is comprised of at least one cyclic carbonate having a six to ten membered ring.

5. A lithium secondary battery comprising:
a negative electrode, which is capable of absorbing and desorbing lithium,
a positive electrode, which is capable of absorbing and desorbing lithium, and
a non-aqueous electrolyte,
wherein said non-aqueous electrolyte is formed of a substance such that the non-aqueous electrolyte is solidified by a chemical reaction at a temperature of at least 100° C.,
wherein said non-aqueous electrolyte is composed of:
at least a lithium salt and a non-aqueous solvent, and, said non-aqueous solvent comprises:
a non-aqueous solvent in which said lithium salt is dissolved, which is a five or less-membered cyclic compound, and
a non-aqueous solvent which is polymerized by chemical reaction at a temperature of at least 100° C., comprised of at least one sulfate having a seven to eleven membered ring.

6. A lithium secondary battery as claimed in claim 1 or claim 2, wherein
said non-aqueous electrolyte is composed by dissolving at least one of iodine, lithium iodide, lithium fluoride, lithium bromide, lithium chloride, tetrakis(4-fluorophenyl) sodium borate, tetrakis(4-fluorophenyl) lithium borate, isoazobutylnitrile, 1,1'-azobis(cyclohexane-1-carbonitrile), 2,2'-azobis(2-methyl-N-(1,1-bis(hydroxymethyl)ethyl) propionamide, methyl iodide, bromobenzene, tetrabutylammonium iodide, trifluorodiethyl borate, and triester phosphate, as an initiator for the chemical reaction.

7. A lithium secondary battery as claimed in claim 1 or claim 2, wherein
said non-aqueous electrolyte contains at least 70% by volume of an ester carbonate solvent therein.

* * * * *